May 24, 1949.　　　　L. W. SMITH　　　　2,471,379
DUMP WAGON
Filed Aug. 31, 1946　　　　　　　　　　3 Sheets-Sheet 1
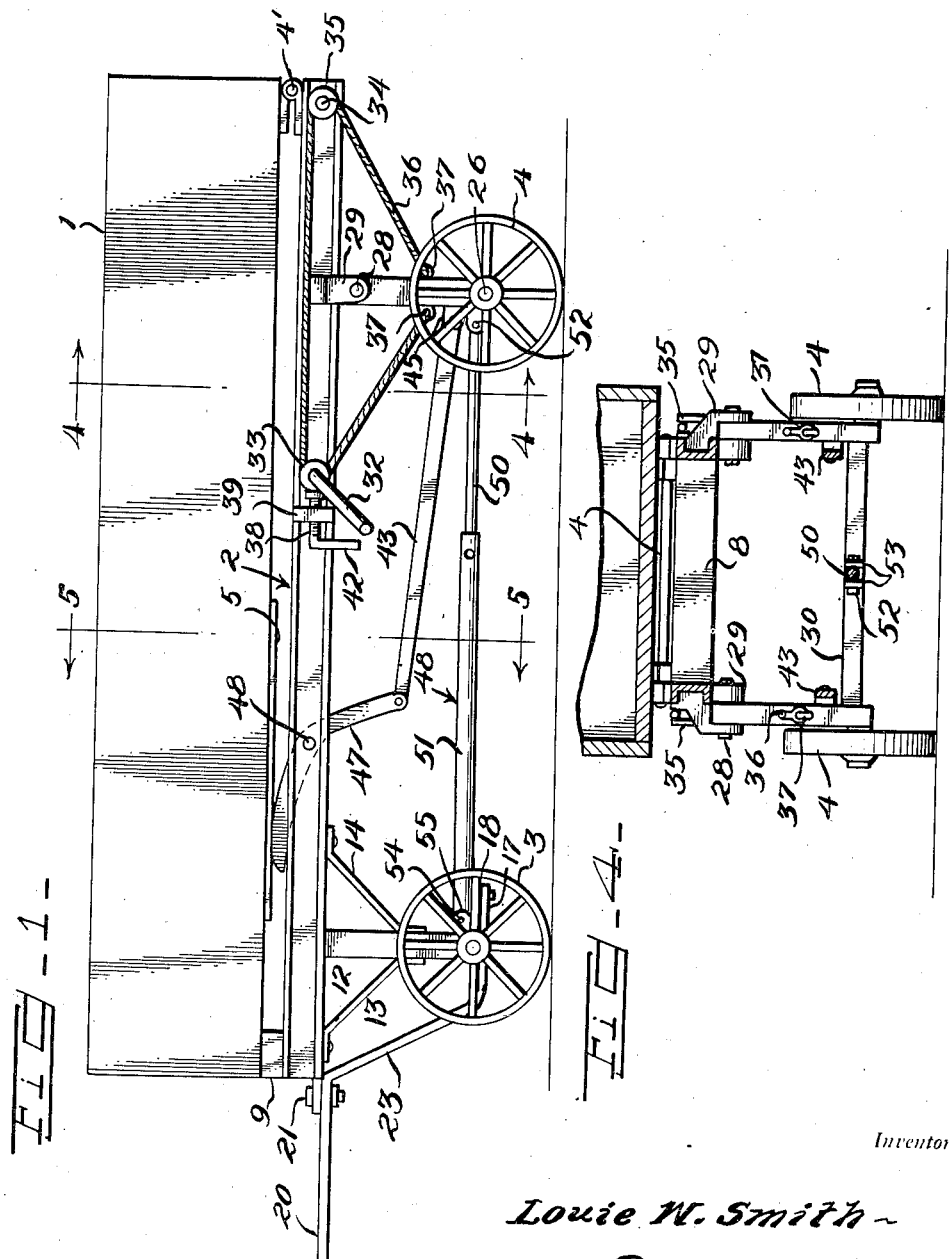
Inventor
Louie W. Smith
By Clarence A. O'Brien
and Harvey B. Jacobson
Attorneys

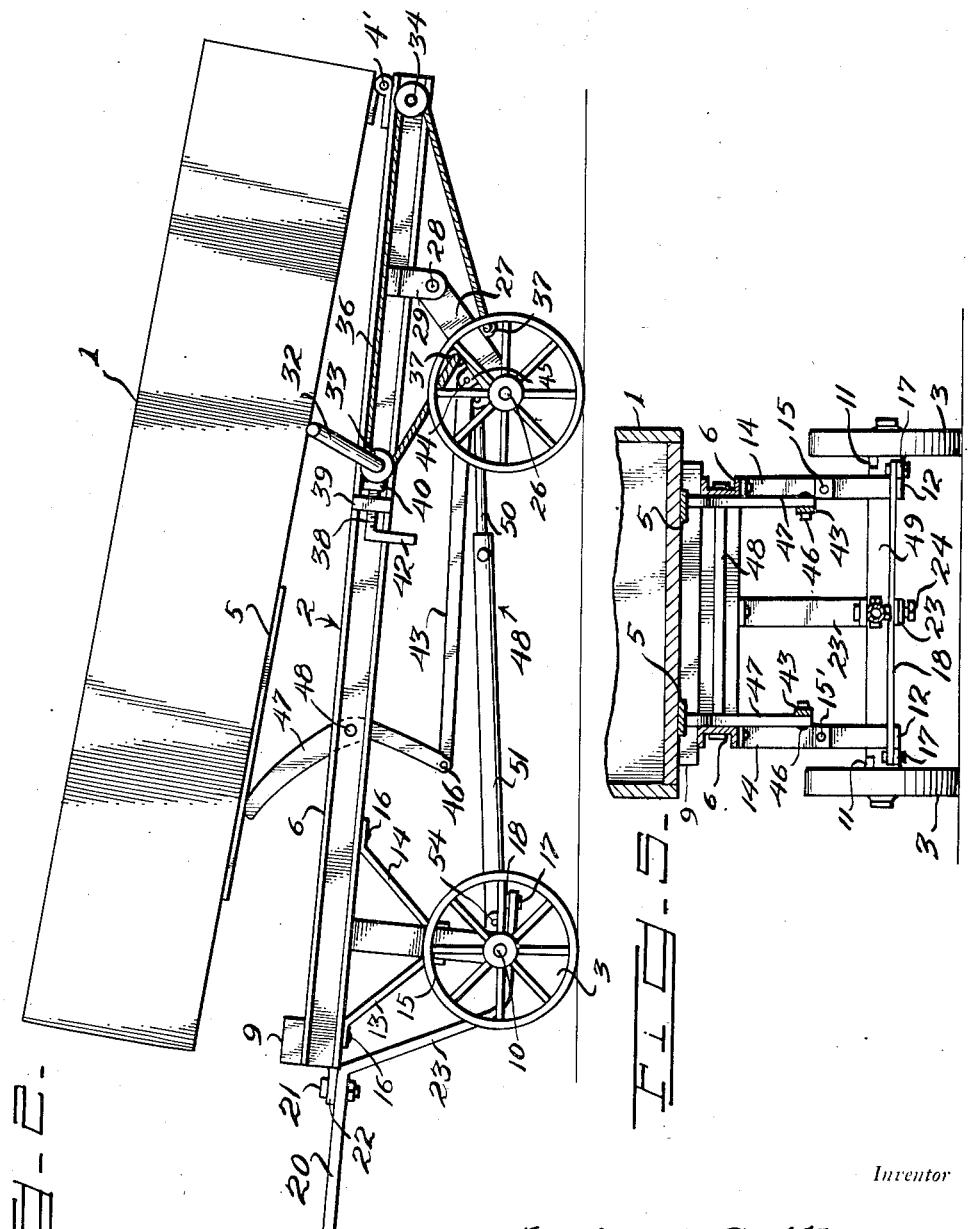

May 24, 1949.   L. W. SMITH   2,471,379
DUMP WAGON
Filed Aug. 31, 1946                           3 Sheets-Sheet 3
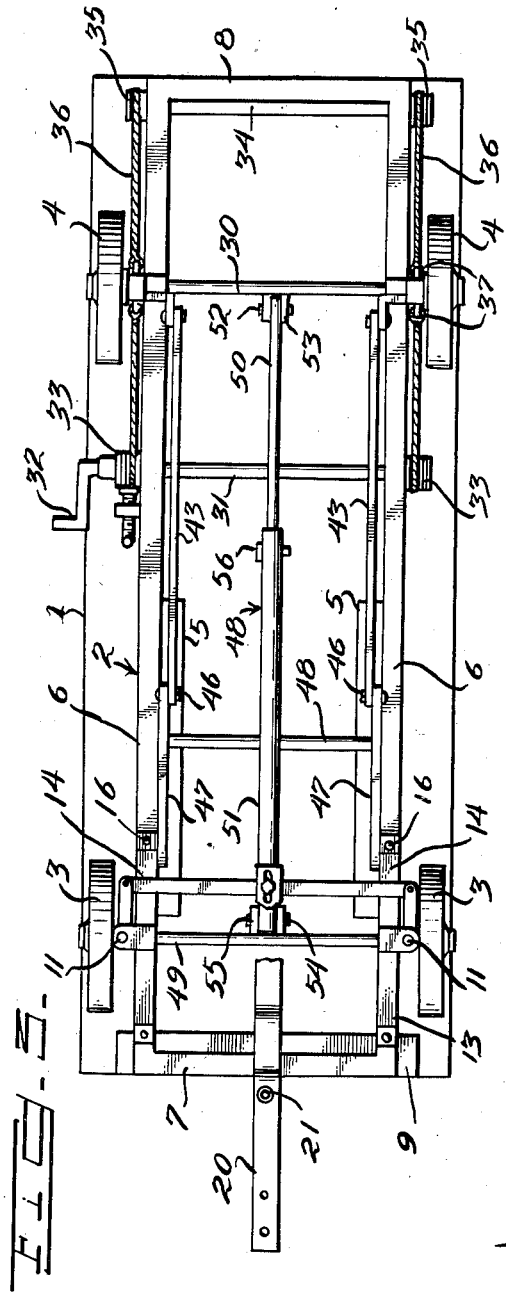
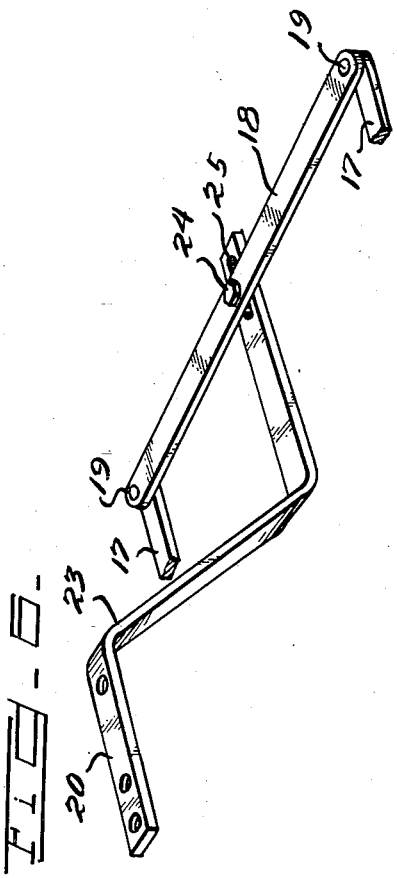
Inventor
Louie W. Smith Patented May 24, 1949

2,471,379

UNITED STATES PATENT OFFICE 2,471,379

DUMP WAGON

Louie W. Smith, Fort Dodge, Iowa

Application August 31, 1946, Serial No. 694,210

6 Claims. (Cl. 298—17)

My invention relates to improvements in dump wagons, the primary object in view being to provide, in a wagon equipped with front and rear wheels, for lowering the rear end of the body substantially to the ground to incline the same downwardly and rearwardly, and for simultaneously swinging the body upwardly and rearwardly to incline the same downwardly and rearwardly at a greater angle than can be obtained by lowering the rear end, all to the end that the body may be inclined for dumping at a greater angle to the horizontal than in dump wagons of the four wheeled type as commonly constructed.

Other and subordinate objects, also comprehended by my invention, together with the precise nature of my improvements will be readily understood when the succeeding description and claims are read with reference to the drawings accompanying and forming part of this specification.

In said drawings,

Figure 1 is a view in side elevation of my improved dump wagon in a preferred embodiment thereof.

Figure 2 is a similar view with the parts shown in the position assumed by the same when the wagon is partly dumped.

Figure 3 is a view in bottom plan.

Figure 4 is a view in transverse section taken on the line 4—4 of Figure 1.

Figure 5 is a similar view taken on the line 5—5 of Figure 1, and

Figure 6 is a fragmentary view in perspective of the steering gear for the front wheels.

Reference being had to the drawings by numerals, my improved dump wagon, as shown, comprises, as the basic elements thereof, a body 1, a body supporting frame 2, and front and rear ground wheels 3, 4 supporting the frame 2 and mounted as presently described.

The body 1 is of the usual box type and is hinged, at its rear end, as at 4' on the rear end of the frame 2 for vertical swinging on said frame upwardly and rearwardly. Wear plates 5 are provided on the bottom of the body 1 adjacent oposite sides thereof and forwardly of the transverse center of said body, for a purpose presently clear.

The frame 2 is of rectangular form and one-piece construction with side bars 6 and front and rear end bars 7, 8 all preferably of angle iron construction. A front transverse bumper bar 9 is provided on the frame 2 and which provides a rest for the front end of the body 1 in the normal position of the body.

The front ground wheels 3 are steering wheels, rotatable on spindles, as at 10, of the usual automobile steering knuckles 11 on the lower ends of a pair of upright posts 12 depending from the side bars 6 of the frame 2 adjacent to the front end of said frame and which are preferably formed integrally with said side bars 6. Front and rear diagonal brace bars 13, 14 extend between the post 12 and the side bars 6 and are fixed to the posts 12, as at 15, and to the side bars 6, as at 16. Steering arms 17 extend rearwardly from the steering knuckles 11, in the usual manner, with the usual connecting cross bar 18 pivoted to the rear ends thereof, as at 19. A bar 20 for attaching a tongue, not shown, to the wagon is pivoted intermediate its ends, as at 21, on a forwardly extending lug 22 on the front bar 7 with a depending angular end portion 23 in the rear of the pivot 21 swingably connected to the cross bar 18 by a bolt 24 extending through a longitudinal slot 25 in said portion 23. As will be clear, the bar 20 is arranged to be swung sidewise by a tongue, not shown, to operate the cross bar 18 endwise and, through the steering arms 17, turn the front wheels 3 for steering.

The rear ground wheels 4 are mounted on spindles, as at 26, on the free ends of a pair of link bars 27 pivoted at the other ends thereof, as at 28, in pairs of ears 29 depending from the side bars 6, the arrangement being such that said link bars 27 are swingable forwardly and rearwardly of the frame 2. A cross bar 30 connects the link bars 27 adjacent to the free ends thereof for swinging of said link bars 27 in unison.

Means are provided for swinging the link bars 27, as follows. A transverse shaft 31 is journalled in the side bars 6 forwardly of the pivots 28 with a crank 32 on one end thereof and a pair of spirally grooved pulleys 33 fast thereon adjacent the side bars 6 on the outer sides thereof. A second transverse shaft 34 is journalled in said side bars 6 in the rear of the pivots 28 with a pair of pulleys 35 fast on the ends thereof and aligned with the pulleys 33. A pair of cables 36 are wound intermediate the ends thereof on the pulleys 33 and trained over the pulleys 35 with ends connected to ears 37 on the front and rear sides of the link bars 27. A lock for the described means is provided in the form of a screw shaft 38 turned through a lateral lug 39 on one side bar 6 of frame 2 with a head 40 on one end thereof adapted to be thrust against one pulley 33 by turning of said shaft, and a crank on the other end thereof for turning the shaft.

As will now be seen, by rotating the pulleys 33 in one direction, through the medium of the crank 32 and shaft 31, the pair of cables 36 will be operated to swing the link bars 27 forwardly, together with the wheels 4, and thereby lower the rear end of the frame 2 and the body 1 about the axis of the spindles 10 so that said frame and body are inclined downwardly and rearwardly as shown, for instance, in Figure 2 which illustrates a partly lowered position of said frame and body. Conversely, by rotating the pulleys 33 in the opposite direction, the pair of cables 36 may be operated to swing the link bars 27 rearwardly into substantially vertical position in which the frame 2 and body 1 will be swung upwardly about the axis of the spindles 10 into substantially horizontal normal position. By operating the shaft 38 to lock the one pulley 33, in the manner already described, the link bars 27 and wheels 4 may be maintained in any position in which the same are swung to maintain the frame 2 and body 1 in the corresponding position.

It is a particular feature of my invention, that swinging of the link bars 27 is utilized to swing the body 1 upwardly and downwardly on the hinges 4' into different angular positions relative to the frame 2, or, into a position parallel to said frame when said body is in normal position. For this purpose, a pair of bars 43 are pivoted at rear ends thereof, as at 44, to ears 45 on the link bars 27 adjacent to the free ends of said bars 27, the bars 43 extending forwardly from said ears 45 with front ends pivoted, as at 46, to the lower ends of crank-like rockers 47 pivoted intermediate the ends thereof, as at 48 on the side bars 6 with the upper ends thereof in wiping engagement with the aforementioned wear plates 5. The bars 43 and rockers 47 are so arranged that when the link bars 27 are swung forwardly, the rockers are swung in one direction, clockwise as viewed in Figures 1 and 2, to swing the body 1 upwardly on the hinges 4', and when said link bars 27 are swung rearwardly, said rockers 47 are swung counterclockwise to permit the body 1 to swung downwardly, under the influence of gravity, on the hinges 4'. As shown in Figure 1, when the link bars 27 are in vertical position, and the frame 2 substantially horizontal, the rockers 47 are swung into a limit of movement in a counterclockwise direction permitting the body 1 to swing downwardly onto the bumper bar 9 into substantially horizontal position.

To brace the link bars 27 against twisting sidewise, a telescopic reach rod 48 is provided to extend between the bar 30 and a similar cross bar 49 connecting the posts 12 adjacent to the lower ends of the same. The reach rod 48 comprises a pair of relatively slidable sections 50, 51, the section 51 being pivoted, as at 52 between a pair of central ears 53 on the cross bar 30 and the section 51 being similarly pivoted as at 54, between ears 55 on the cross bar 49. A pin 56 is provided for insertion through suitable openings, not shown, in the sections 50, 51 to prevent the same from telescoping when the link bars are swung into vertical position and frame 2 and body 1 are in substantially horizontal position. As will be clear, the pin 56 is designed to be removed before the link bars 27 are swung forwardly from vertical position and to permit the sections 50, 51 to telescope during such swinging of said link bars 27.

It will now be clear that, by virtue of the described means for swinging the link bars 27 and rear wheels 4, the frame 2 may be swung downwardly upon the axis of the spindles 10 until the rear end of the frame is substantially on the ground. At the same time, through the medium of the link bars 27, bars 43 and rockers 47, the body 1 will be swung upwardly on the hinges 4' into a position in which it is inclined downwardly and rearwardly at a greater angle to the horizontal than the frame 2. The advantage of this is, providing for swinging of the body 1 into a sharply inclined dumping position with its rear end close to the ground, or to any other surface upon which it is desired to dump the wagon.

The foregoing will, it is believed, suffice to impart a clear understanding of my invention, since the operation thereof has been set forth in connection with the description of the parts.

Manifestly, modifications of the invention may be resorted to, without departing from the inventive concept, and right is herein reserved to such modifications, as fall within the scope of the appended claims.

What I claim is:

1. In a dump wagon including front and rear wheels, a frame supported at the front end thereof by the front wheels for swinging about the axis of said front wheels into downwardly and rearwardly inclined position to lower the rear end of the frame, means to mount the rear wheels on said frame for forward swinging thereon to permit said frame to swing into said position under the influence of gravity, a body hinged on said frame for swinging thereon into a downwardly and rearwardly inclined position, and means operative by the means first mentioned to swing said body.

2. In a dump wagon including front and rear wheels, a frame supported at the front end thereof by the front wheels for swinging about the axis of said front wheels into downwardly and rearwardly inclined position to lower the rear end of the frame, means to mount the rear wheels on said frame for forward swinging thereon to permit said frame to swing into said position under the influence of gravity, a body hinged on said frame for swinging thereon into a downwardly and rearwardly inclined position, means operative by the means first mentioned to swing said body, and locking means for the first mentioned means.

3. In a dump wagon including front and rear wheels, a frame supported at the front end thereof by the front wheels for swinging about the axis of said front wheels into downwardly and rearwardly inclined position to lower the rear end of the frame, means to mount the rear wheels on said frame for forward swinging thereon to permit said frame to swing into said position under the influence of gravity, a body hinged on said frame for swinging thereon into a downwardly and rearwardly inclined position, and means operative by the means first mentioned to swing said body, the means first mentioned comprising a pair of link bars pivoted on said frame at opposite sides thereof for swinging forwardly beneath the frame and having the rear wheels mounted thereon, and cable and pulley means for swinging said bars.

4. In a dump wagon including front and rear wheels, a frame supported at the front end thereof by the front wheels for swinging about the axis of said front wheels into downwardly and rearwardly inclined position to lower the rear end of the frame, means to mount the rear wheels on said frame for forward swinging thereon to permit said frame to swing into said position under the influence of gravity, a body hinged on said frame for swinging thereon into a downwardly and rearwardly inclined position, and means operative by the means first mentioned to swing said body, the means first mentioned comprising a pair of link bars pivoted on said frame at opposite sides thereof for swinging forwardly beneath the frame and having the rear wheels mounted thereon, and cable and pulley means for swinging said bars, the second mentioned means comprising a pair of body engaging rockers on said frame, and operating connections between said link bars and rockers.

5. In a dump wagon including front and rear wheels, a frame supported at the front end thereof by the front wheels for swinging about the axis of said front wheels into downwardly and rearwardly inclined position to lower the rear end of the frame, means to mount the rear wheels on said frame for forward swinging thereon to permit said frame to swing into said position under the influence of gravity, a body hinged on said frame for swinging thereon into a downwardly and rearwardly inclined position, and means operative by the means first mentioned to swing said body, the means first mentioned comprising a pair of link bars pivoted on said frame at opposite sides thereof for swinging forwardly beneath the frame and having the rear wheels mounted thereon, and cable and pulley means for swinging said bars, the second mentioned means comprising a pair of body engaging rockers on said frame, and operating connections between said link bars and rockers, comprising bars pivoted at opposite ends thereof to said link bars and rockers.

6. In a dump wagon including front and rear wheels, a frame supported at the front end thereof by the front wheels for swinging about the axis of said front wheels into downwardly and rearwardly inclined position to lower the rear end of the frame, means to mount the rear wheels on said frame for forward swinging thereon to permit said frame to swing into said position under the influence of gravity, a body hinged on said frame for swinging thereon into a downwardly and rearwardly inclined position, and means operative by the means first mentioned to swing said body, the means first mentioned comprising a pair of link bars pivoted on said frame at opposite sides thereof for swinging forwardly beneath the frame and having the rear wheels mounted thereon, and cable and pulley means for swinging said bars, the cables being wound intermediate the ends thereof on certain of the pulleys with ends connected to opposite sides of said link bars.

LOUIE W. SMITH.

REFERENCES CITED

The following references are of record in the file of this patent:

UNITED STATES PATENTS

| Number | Name | Date |
|---|---|---|
| 1,538,052 | Mueller | May 19, 1925 |
| 1,582,740 | Fager | Apr. 27, 1926 |

FOREIGN PATENTS

| Number | Country | Date |
|---|---|---|
| 478,104 | Germany | Apr. 5, 1928 |